United States Patent [19]

Cloutier et al.

[11] Patent Number: 4,993,189
[45] Date of Patent: Feb. 19, 1991

[54] FLOATING FIXTURE PLATEN

[75] Inventors: Daniel R. Cloutier, Clayton; Gerry R. Schnitzler, Oakville, both of Mo.

[73] Assignee: Sunnen Products Company, St. Louis, Mo.

[21] Appl. No.: 401,757

[22] Filed: Sep. 1, 1989

[51] Int. Cl.$^5$ .............................................. B24B 7/00
[52] U.S. Cl. ..................................... 51/72 R; 51/230; 51/34 R; 51/91 R; 269/60; 269/71; 408/91; 409/195
[58] Field of Search .................... 51/72 R, 73 R, 230, 51/231, 233, 34 R, 34 C, 34 H, 34 F, 44, 45, 64, 91 R, 92 R, 121, 122; 408/11, 91; 409/195, 153, 187, 194; 269/60, 71, 101, 234

[56] References Cited

U.S. PATENT DOCUMENTS 4,012,030  3/1977  Hesselgren ........................... 408/90
4,094,103  6/1978  Ebelt .................................... 51/34 F Primary Examiner—Frederick R. Schmidt
Assistant Examiner—M. Rachuba
Attorney, Agent, or Firm—Haverstock, Garrett & Roberts

[57] ABSTRACT

A floating fixture platen for use on machine tools having a machine support structure and a machine tool portion rotatable about an axis of rotation, the floating fixture platen including a planar member mounted on the machine support structure in a position normal to the axis of rotation of the rotating tool portion, the platen supporting a workpiece to be operated on by the rotating tool, apparatus on the support structure enabling the platen limited relative free movement in a plane substantially normal to the axis of rotation of the tool whereby rotation of the tool will produce torque in the platen and in the workpiece supported thereby, first and second oppositely facing fluid assemblies each having a piston portion engagable with a surface on the platen and positioned to oppose rotation of the platen, the fluid assemblies having pressure generated therein by the movement of the platen, and a fluid connection between the fluid assemblies to equalize the pressures therein.

20 Claims, 2 Drawing Sheets

FLOATING FIXTURE PLATEN

DESCRIPTION OF THE PRIOR ART

There are many devices and fixtures in existence for holding and supporting workpieces while they are operated on by a machine such as a honing, grinding, reaming or milling machine where the machine includes a working element that rotates about an axis while engaged with a surface on the workpiece. The known devices for the most part are rigid support fixtures or devices which rigidly hold each workpiece as it is operated on. In some cases the holder and/or the tool reciprocates during the honing, grinding, reaming or milling operation. There are many forms of such fixturing including the devices disclosed in the following listed U.S. Pats. which are the closest known prior art, to wit:

| 3,918,348 | Runft | Nov. 11, 1975 |
| 4,444,061 | Mathias | Apr. 24, 1984 |
| 4,485,681 | Hatamura | Dec. 4, 1984 |
| 4,666,352 | Nagao et al | May 19, 1987 |
| 4,178,799 | Schmieder et al | Dec. 18, 1979 |
| 3,741,071 | Hoglund | June 26, 1973 |
| 4,094,103 | Ebelt | June 13, 1978 |
| 4,012,030 | Hesselgren | Mar. 15, 1977 |

None of the patents listed above discloses a construction that has a floating platen for holding and supporting a workpiece, and none discloses such a device that has means that bear against spaced opposed plungers in hydraulic or like cylinders or assemblies, which cylinders or assemblies are connected into a closed fluid system as in the preferred forms of the present construction. Furthermore, no known device has means that hold and support a fixture platen in a balanced condition by means of a counter balancing spring as in some forms of the present invention, and no known device includes a construction wherein a platen is allowed limited relatively free movement in a plane normal to the axis of rotation of the tool in order to improve tool and workpiece accuracies, relieve stresses and to maintain the workpiece in a highly desirable stress free condition with respect to the working member or tool and compensate for any misalignment between the tool and a bore it is working on. By supporting a workpiece in this manner the accuracy of the work performed is substantially improved.

The present invention teaches the construction and operation of a floating fixture platen for supporting a workpiece which overcomes many of the disadvantages and shortcomings of the known prior art devices including the devices disclosed in the above patents.

BRIEF DESCRIPTION OF THE PRESENT INVENTION

The present invention resides in a floating fixture platen used for mounting and supporting a workpiece having a surface to be honed, ground, reamed, milled or otherwise worked on by a rotating tool such as a honing mandrel, a grinding tool, a reamer, a milling or the like tool. The subject floating platen is mounted in or on a supporting structure, usually in a vertical or in a horizontal orientation. In the vertical embodiment the floating platen is used for supporting a workpiece having a horizontally oriented bore to be operated on by the rotating tool while in the horizontal embodiment the platen is used for supporting a workpiece having a vertically oriented bore to be operated on. The floating fixture platen in both embodiments has means that engage the plunger portions of two spaced and substantially oppositely facing, but not necessarily diametrically opposed, plungers, which are parts of linear actuators or the like such as hydraulic cylinder assemblies that have their cylinder chambers connected into a common fluid system. In the vertical embodiment the floating fixture platen is maintained in its vertical or on-edge orientation and is counterbalanced by a spring or other biasing means located in alignment with the axis of rotation of the tool or center of gravity of the platen and workpiece. The platen in the vertical orientation is supported so as to have some limited free movement in a plane normal to the axis of rotation of the tool by means of a plurality of adjustable members. The free movement available to the platen and to a workpiece and workpiece fixturing attached thereto, maintains the workpiece surface in a most desirable stress free aligned condition with respect to the tool that is operating on it. The platen in this construction can optionally be locked into a fixed position by a separate air cylinder or like locking mechanism but when the machine tool is operating on a supported workpiece the platen should not be locked but should be relatively free floating. The idea is that when the tool rotates while engaged with the workpiece surface some pressure will be applied to the plunger portions of the cylinder assemblies engaged with the platen. Since the fluid pressure in each assembly is connected in common with the other they will remain the same. However, because the platen is free floating within limits if binding or misalignment occurs between the workpiece and the tool the workpiece will be able to move somewhat to restore alignment and prevent any binding. To accomplish this the position of the platen is shifted somewhat to relieve the stresses and improve the operation. The distance between the plungers together with the pressures encountered taking into account the cylinder area of the cylinder assemblies may also be used in some applications to produce a response in a transducer or other sensor that is proportional to the torque applied to the workpiece by the tool. In some applications this response can be used to produce a suitable signal for display and/or control purposes such as to control the feed rate of the tool, to adjust the tool pressure, and so forth.

In the horizontal embodiment some modifications of the platen support means may be required to compensate for the friction produced between the platen and the horizontal platen support means or support surface. This is necessary in the horizontal embodiment because in this position there is no need to counterbalance the platen by spring or like means. Suitable bearing and/or lubricating means can be provided for this purpose. The important thing is that the fixture platen be as free floating as possible so that there will be minimal friction forces to contend with. In the horizontal as in the vertical construction a response indicative of the torque can be produced by the oppositely facing hydraulic cylinder assemblies connected into a closed hydraulic or like system as indicated above.

OBJECTS OF THE INVENTION

It is a principal object to produce more accurate surfaces on workpieces operated on by rotating tools.

Another object of the present invention is to teach the construction and operation of a floating fixture platen for supporting a workpiece being operated on by a rotating machine tool to improve the operating characteristics of the tool, relieve stresses, maintain alignment between tool and workpiece surface and produce more nearly perfect finished surfaces on the workpiece.

Another object is to provide means for producing responses proportional to the torque produced on a workpiece by a working member.

Another object is to reduce forces that tend to produce tension, binding and other stresses in a workpiece and in a tool operating thereon.

Another object is to improve the operating characteristics of machine tools.

Another object is to provide a floating fixture platen for supporting workpieces that operates to reduce binding between a tool and a workpiece.

These and other objects and advantages of the present invention will become apparent after considering the following detailed description of preferred embodiments in conjunction with the accompanying drawings.

DETAILED DESCRIPTION OF THE INVENTION

Figure 1:
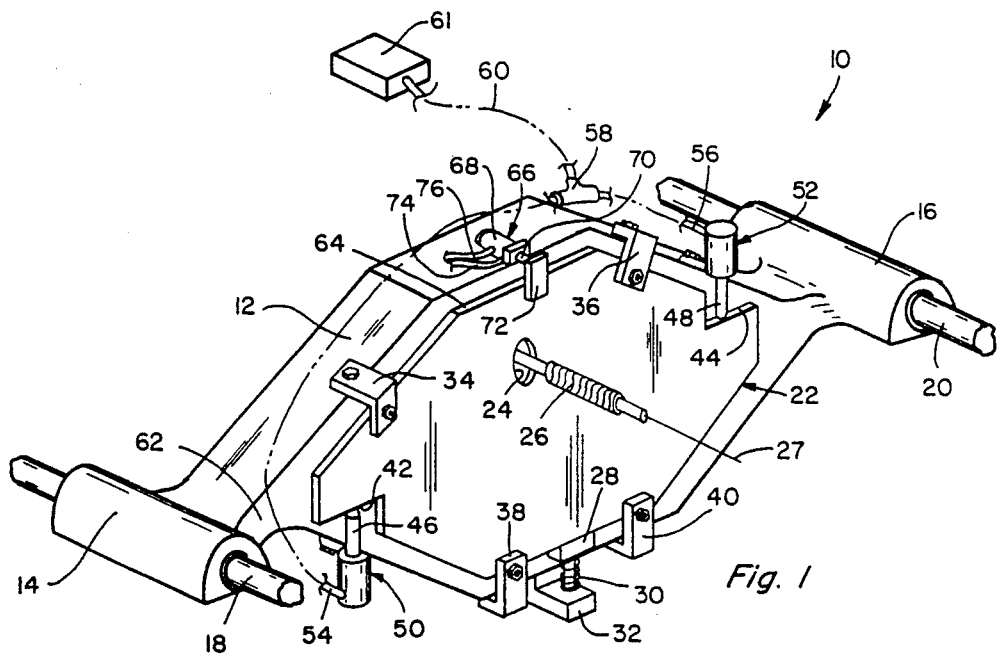
FIG. 1 is a perspective view showing the construction of a vertically oriented floating fixture platen mounted on a machine tool.

Referring to the drawings more particularly by reference numbers, number 10 in FIG. 1 refers to a reciprocating assembly for supporting a workpiece to be operated on by a machine tool. The reciprocating assembly includes a support member 12 shown having opposite end portions 14 and 16 which are slideably positioned for movement along rails 18 and 20. The support structure 12 has means thereon for supporting a so called floating fixture platen 22 which is mounted in a position that will be described, and within limits is able to move freely in a plane normal to the axis of rotation of the rotating tool. The platen 22 is shown as being a relatively flat preferably metallic member mounted with its plane in a vertical or on-edge orientation. The platen 22 has an opening 24 located in a generally central location and the opening 24 as will be described includes means for accommodating a fixturing assembly for supporting a workpiece to be operated on. The structure as shown is mounted on the rails 18 and 20 to enable it to be reciprocated back and forth during operation but it should be understood that either or both the platen 22 and/or the tool 26 can be reciprocated or maintained in a stationary position. The tool 26 is shown as being a honing mandrel that rotates about its axis of rotation 27 and in the position shown is aligned with a central position in the opening 24. The platen 22 rests on a plunger 28 which has means thereon for engaging the upper end of coil spring 30. The lower end of the spring 30 engages a projecting member 32 attached to the support structure 12. The spring 30 is strong enough to support and counterbalance the platen 22 and a workpiece mounted thereon and is provided to maintain the platen 22 in a desired vertical position and yet enables the platen 22 to move to some extent in the plane thereof or in a plane normal to the axis of rotation 27 of the tool 26. The platen 22 is maintained in its vertical orientation on the support structure 12 by a plurality of L-shaped members 34, 36, 38 and 40 each of which includes adjustment means which will be described in connection with FIG. 4.

The opposite ends of the platen 22 as shown have opposed cutouts formed therein which include oppositely facing surfaces 42 and 44 respectively. The surfaces 42 and 44 engage piston portions 46 and 48 of respective hydraulic piston assemblies 50 and 52. The hydraulic assemblies 50 and 52 face in opposite directions as do the surfaces 42 and 44 but they do not need to be on diametrically opposite sides of the axis of rotation 27. The hydraulic assembly 50 is connected to hydraulic line 54 and the hydraulic assembly 52 is connected to hydraulic line 56. The hydraulic lines 54 and 56 are connected to opposite sides of a T-junction 58 which has an hydraulic connection connected to an optional hydraulic line 60. The optional line 60 can be connected to a pressure sensitive device or transducer 61 which responds to the pressure produced therein to produce an electric or mechanical response proportional thereto. This response is also proportional to the torques sensed on the workpiece. It is important to recognize that the platen 22 is positioned in abutment or close abutment with surface 62 on the support structure 12 although spaced projections on the platen or on the support structure 12 could be provided to minimize the contact therebetween and hence the amount of friction between the platen and the support structure 12.

Mounted on the support structure 12 adjacent to the top edge 64 of the platen 62 is an assembly 66 which includes a cylinder housing 68 from which a piston portion 70 extends for connection to a platen locking member 72. The piston assembly 66 has two connections 74 and 76 connected to locations adjacent to opposite ends thereof. When pressure is introduced into the connection 76 the member 72 will be moved to a position spaced forwardly from the platen 22 to free the platen, and when pressure is introduced into the connection 74 the member 72 will be moved into clamping engagement with the platen 22 to lock the platen in fixed position on the support structure 12. The clamped position of the member 72 is used when the machine tool on which the platen is used is inoperative as when automatic workpiece loading takes place at a position away from the tool. In this position the platen 22 is not able to move freely in its plane and therefore is not able to take advantage of the floating feature which is so important to the present invention.

Figure 2:
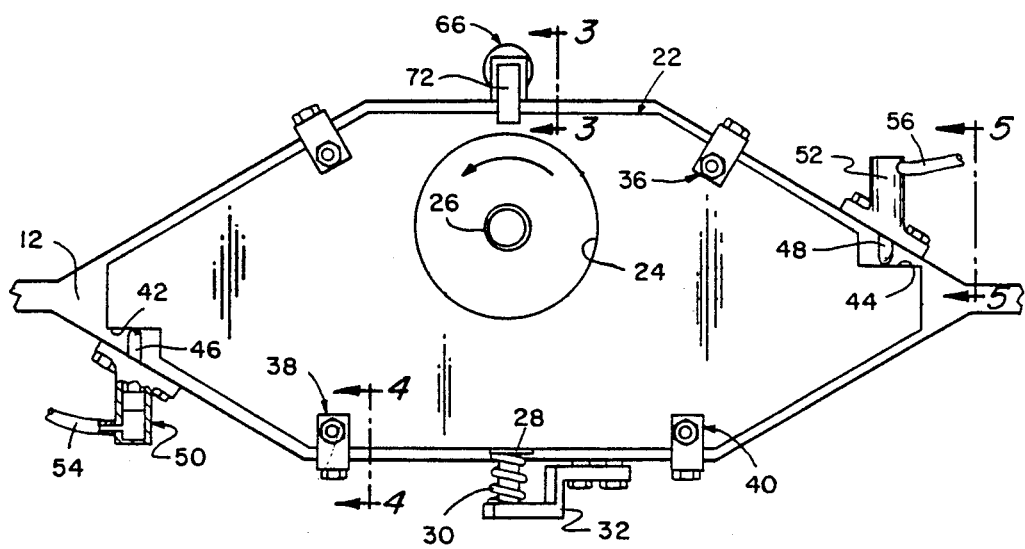
FIG. 2 is a front elevational view of the floating fixture platen and associated mounting means of FIG. 1.

FIG. 2 is a front view of the structure shown in FIG. 1 with an arrow to indicate the direction of rotation of the machine tool 26. When the machine tool is engaged with a workpiece being supported by means on the platen 22 the rotation of the tool 26 will cause the workpiece and the platen 22 to try to move in a counterclockwise direction exerting upward force on the piston 48 in the hydraulic assembly 52 and downward pressure on the piston 46 in the hydraulic assembly 50. If the tool is in perfect alignment with the workpiece surface and there are no stresses or binding between the tool and the workpiece the pressures on the pistons 46 and 48 would ideally be the same.

Any inequality in the pressure applied to the pistons 46 and 48 will be due to stresses or bending between the tool 26 and the workpiece and will be reflected in the pressure in the respective assemblies 50 and 52. These differences will equalize themselves through the hydraulic connections 54, 56 and 60 which are in communication with each other. However, since it is the tool engaged with the workpiece that causes any such pressure inequality, the inequalities are overcome or relieved by movements of the platen 22 and the workpiece being operated on. These movements will be in a direction to relieve the tensions and stresses and to maintain alignment between the tool and the workpiece surface. This relieving of the binding and other tensions and stresses between the tool and the workpiece enables the tools to produce much more accurate surfaces than is possible with any known devices.

Figures 3, 4, 5:
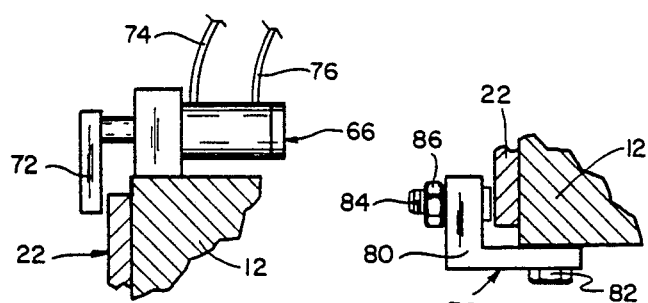
FIG. 3 is an enlarged fragmentary cross-sectional view taken on line 3—3 of FIG. 2.
FIG. 4 is an enlarged fragmentary cross-sectional view taken on line 4—4 of FIG. 2.
FIG. 5 is an enlarged fragmentary side elevational view taken on line 5—5 of FIG. 2.

FIG. 3 is a fragmentary cross-sectional view showing the details of the construction of the clamping assembly 66 including the clamping member 72 that engages an upper edge portion of the platen 22 when locked. In order to lock or clamp the platen in fixed position pressure is introduced into the line 74 to move the member 72 to the right as shown in FIG. 3.

FIG. 4 is a cross-sectional view showing the construction of the adjustable assembly 38. The assembly 38 is similar in construction to the assemblies 34, 36 and 40. The assembly 38 includes the L-shaped bracket member 80 one leg of which is attached to the support structure 12 by means of threaded member 82. The other leg of the L-shaped member 80 has a threaded member 84 positioned therein. The threaded member 84 carries a locknut 86 which is used to lock the member 84 in position spaced from the platen 22 as shown to allow the platen freedom to move only in a plane normal to the axis of rotation.

FIG. 5 is a fragmentary side view showing a typical mounting for one of the hydraulic assemblies 52 (or 54). The assembly 52 which is shown has the plunger portion 48 abutting the surface 44 on the platen 22 as aforesaid.

Figure 6:
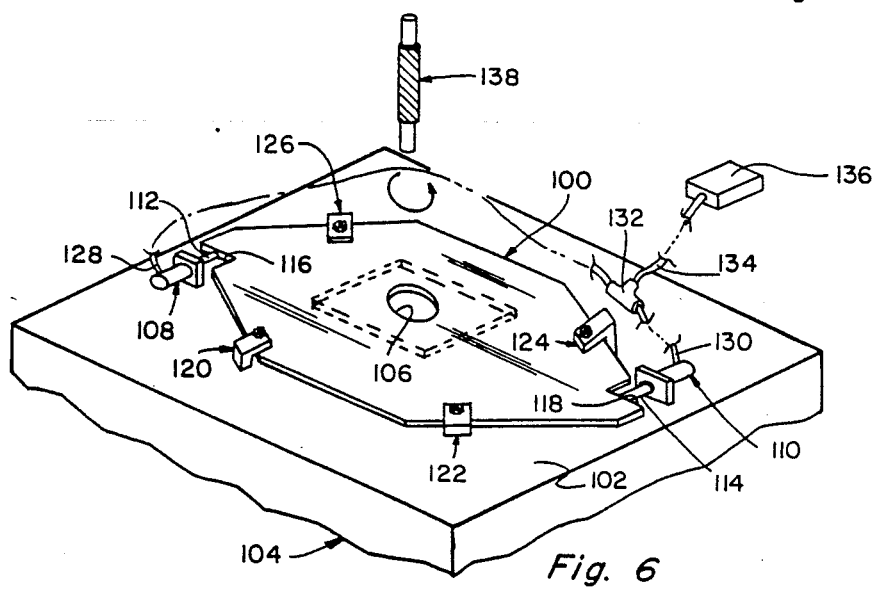
FIG. 6 is a perspective view showing a horizontally oriented floating platen fixture constructed according to another embodiment of the present invention.

FIG. 6 shows a horizontally oriented platen member 100 which is similar in many respects to the platen 22 but instead of being mounted on-edge in a vertical orientation it is positioned for movement on the upper surface 102 of a support structure 104. The platen 100 like the platen 22 has a hole or opening 106 located at an appropriate position to accommodate a fixture for supporting a workpiece. The horizontal platen like the vertical has a pair of spaced opposed hydraulic piston assemblies 108 and 110 each of which has a respective piston portion 112 and 114 which engages a respective opposed surface 116 and 118 formed in cutouts adjacent opposite ends of the platen 100. The position of the platen 100 on the surface 102 is maintained by means of a plurality of spaced assemblies 120, 122, 124 and 126 which may be similar to the assemblies 34-40 described above in connection with FIGS. 1,2 and 4. The opposed piston assemblies 108 and 110 have respective hydraulic connections or lines 128 and 130 which in turn are connected to opposite sides of a T-connector 132 that has another connection 134 in some cases to a transducer 136 similar to the transducer 61. In the horizontal construction shown in FIG. 6 the tool 138 is shown in an overhead rotating position for rotation in a counter-clockwise direction (see arrow) so that when engaged with a workpiece it will apply pressure or torque force against the opposed pistons 112 and 114 in the manner discussed above. The operation of the horizontal embodiment is similar to that described above for the vertical embodiment.

Suitable clamping means (not shown) can be provided for the horizontal construction of the floating platen but this is usually not neccessary as it is for the vertical platen orientation.

Figure 7:
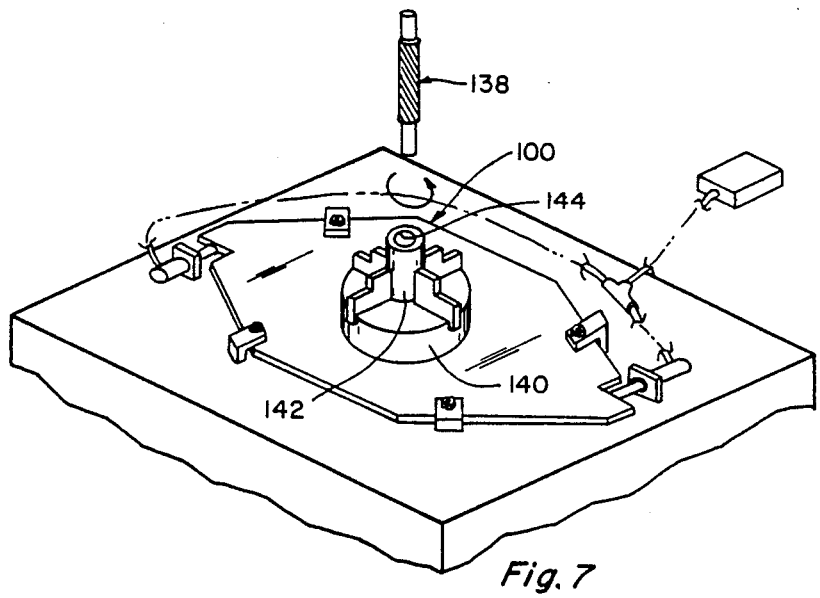
FIG. 7 is a view similar to FIG. 6 but showing a workpiece and associated fixturing mounted on a floating fixture platen.

FIG. 7 is a view similar to FIG. 6 but in addition shows provision for a workpiece mounting fixture or chuck 140 mounted on the floating platen 100 with workpiece 142 mounted therein. The workpiece 142 is shown having a work surface 144 aligned to rotatably receive the rotating tool 138.

It is contemplated that with the horizontal construction some form of bearing means or lubricating means will be provided between the platen 100 and the surface 102 of the support structure 104. This will minimize the amount of friction between the members and will increase the sensitivity and floatability of the platen on the support structure. The freer the platen is to move the better it will be able to respond to stresses and binding between the workpiece and the tool and the more accurate will be the torque outputs measured by the transducer 136. Ballbearings or other forms of bearing means can be used for this purpose. It is also contemplated to provide spaced projections or bushings (not shown) on the support surface 102 or on the platen to further reduce friction therebetween.

When a tool such as a honing mandrel rotates against the surface of a workpiece held in a rigid fashion as has been the custom in the past some twisting, bending, binding and out of alignment movement will take place between the mandrel and the workpiece and this will adversely affect the accuracy of the surfaces being produced. These forces, regardless of their magnitude, will cause some imperfections in the surfaces. They may also cause damage to the tool and may shorten the tool life. With the subject floating fixture platen used as the support for the workpiece it is possible to overcome the affects of these conditions. Being able to do this not only improves the accuracy of the work surfaces being produced but also minimizes the requirement for spark-out to relieve stresses in the workpiece and in the mandrel or other tool where the working member or tool is allowed to continue to rotate in the worksurface for a period of time after the surface reaches its desired size and surface finish. Hence, the present floating platen construction may actually shorten the time required to produce a desired surface while at the same time generating more accurate surfaces. The present invention therefore teaches the construction of improved means for supporting a workpiece being operated on by a rotating tool while improving the accuracy of the worksurfaces being produced by such tool.

Thus there has been shown and described a novel floating fixture platen device for use on machine tools which fulfills all the objects and advantages sought therefor. It will be apparent to those skilled in the art, however, that many changes, modifications, variations and other uses and applications for the subject device are possible and all such changes, modifications, variations and other uses and applications which do not depart from the spirit and scope of the invention are deemed to be covered by the invention which is limited only by the claims which follow.

What is claimed is:

1. Improved means for supporting a workpiece having a surface to be operated on by a rotating tool comprising a support structure, a workpiece supporting member including means to support the supporting member on the support structure in position so that the supporting member is able to move relative to the support structures in a plane normal to the axis of rotation of a rotating tool, first and second fluid assemblies each including a piston portion, spaced surfaces on the supporting member engagable respectively with the piston portions so as to oppose movement of the supporting member when a rotating tool is engaged with a workpiece, and means communicating the fluid assemblies to equalize the fluid pressures produced therein.

2. The means of claim 1 wherein the supporting member is a substantially planar member having its plane oriented in a substantially vertical position.

3. The means of claim 1 wherein the supporting member is a substantially planar member supported on the support structure in a substantially horizontal position.

4. The means of claim 2 including resilient means located substantially in alignment with the center of gravity of the supporting member including the workpiece.

5. The means of claim 1 wherein the fluid assemblies are positioned in spaced opposed relation adjacent opposite sides of the supporting member.

6. The means of claim 1 including transducer means connected to communicate with the fluid pressure in said fluid assemblies.

7. The means of claim 1 including means to lock the supporting member in fixed position.

8. The means of claim 1 including means on the supporting member for mounting a workpiece.

9. The means of claim 1 including means adjustable to limit movement of the supporting member in a direction parallel to the axis of rotation of a tool.

10. A floating fixture platen for use on machine tools having a machine support structure and a machine tool portion rotatable about an axis of rotation, the floating fixture platen including a substantially planar member mounted on a machine support structure in a position normal to the axis of rotation of the rotating tool portion, means on the platen for supporting a workpiece to be operated on by a rotating tool, means for supporting the platen in position on a machine support structure to permit limited relatively free movement of the platen and a workpiece being supported thereby in a plane substantially normal to an axis of rotation the a tool, spaced substantially opposed surfaces on the platen, first and second oppositely facing fluid assemblies each having a piston portion movable therein and extendable therefrom, the piston portion of the first fluid assembly engaging one of the opposed platen surfaces and the piston portion of the other assembly engaging the other opposed platen surface, and fluid connection means connected between and communicating the fluid assemblies for equalizing the pressures therein.

11. Means for supporting a workpiece having a surface to be operated on by a tool rotatable about a tool axis comprising a support structure-and a rotatable tool mounted adjacent thereto, mounting means on the support structure for mounting a workpiece in position to have a surface thereon operated on by the rotatable tool, said mounting means including a platen member having workpiece engaging and supporting means thereon, means on the support structure enabling the platen member to have limited movement in a plane substantially normal to the axis of rotation of the rotatable tool, said platen member having oppositely facing first and second surfaces at spaced locations adjacent opposite sides thereof, first and second assemblies each including a piston portion engagable respectively with the oppositely facing first and second platen surfaces, and means to equalize the pressure in the first and second assemblies.

12. The means for supporting a workpiece of claim 11 wherein the platen member is a substantially planar member oriented in a substantially vertical orientation.

13. The means for supporting a workpiece of claim 12 including resilient means engagable with one edge of the platen member to resiliently maintain the platen member and the workpiece in a predetermined counterbalanced condition.

14. The means for supporting a workpiece of claim 11 wherein the platen member is a substantially planar member oriented in a substantially horizontal position on the support structure.

15. The means for supporting a workpiece of claim 11 including transducer means operatively connected to communicate the pressure in the assemblies.

16. The means for supporting a workpiece of claim 12 including means to lock the platen member in a fixed position on the support structure.

17. The means for supporting a workpiece of claim 11 including fixturing means mounted on the platen member for supporting a workpiece.

18. The means for supporting a workpiece of claim 11 including means on the support structure for producing reciprocating motion of the platen member and the workpiece supported thereon.

19. The means for supporting a workpiece of claim 11 wherein the rotatable tool is a honing mandrel.

20. Means for resisting torque imparted to a workpiece by a tool rotatable about an axis of rotation and engaged therewith comprising by the rotating tool, means enabling the support means and the workpiece limited movement in a plane normal to the axis of rotation of the rotatable tool, said support means having two spaced and opposed surfaces, a pair of fluid cylinders each having a piston extendable therefrom and engagable with the respective opposed surfaces, and means connected between the cylinders to communicate the fluid contained therein.

* * * * *